(12) United States Patent
Huang et al.

(10) Patent No.: US 7,596,783 B2
(45) Date of Patent: Sep. 29, 2009

(54) METHODS AND APPARATUS TO IMPLEMENT ANNOTATION BASED THUNKING

(75) Inventors: Bo Huang, Shanghai (CN); Jiangning Liu, Shanghai (CN); Lei Gao, Aachen (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/440,850

(22) Filed: May 25, 2006

(65) Prior Publication Data

US 2007/0234286 A1   Oct. 4, 2007

Related U.S. Application Data

(63) Continuation of application No. PCT/CN2006/000579, filed on Mar. 28, 2006.

(51) Int. Cl.
*G06F 9/44* (2006.01)

(52) U.S. Cl. ............... 717/146; 717/118; 719/312

(58) Field of Classification Search .............. None
See application file for complete search history.

(56) References Cited

U.S. PATENT DOCUMENTS

| 5,729,748 | A * | 3/1998 | Robbins et al. ............. 717/137 |
| 5,838,978 | A | 11/1998 | Buzbee |
| 6,081,665 | A * | 6/2000 | Nilsen et al. ............... 717/116 |
| 6,167,565 | A * | 12/2000 | Kanamori ................... 717/146 |
| 6,314,445 | B1 * | 11/2001 | Poole ............................. 718/1 |
| 6,314,558 | B1 * | 11/2001 | Angel et al. ................. 717/118 |
| 6,481,006 | B1 * | 11/2002 | Blandy et al. ............... 717/139 |
| 6,553,429 | B1 * | 4/2003 | Wentz et al. ................. 719/330 |
| 6,647,546 | B1 * | 11/2003 | Hinker et al. ................ 717/137 |
| 6,980,997 | B1 * | 12/2005 | Peschel-Gallee et al. . 707/103 Y |
| 6,993,754 | B2 * | 1/2006 | Freudenberger et al. .... 717/153 |
| 7,065,771 | B1 * | 6/2006 | Prabhu et al. ............... 719/330 |
| 7,099,490 | B1 | 8/2006 | Fujita et al. |
| 7,107,584 | B2 * | 9/2006 | Bond et al. .................. 717/151 |
| 7,181,724 | B2 * | 2/2007 | Sokolov et al. ............. 717/116 |
| 2005/0076331 | A1 * | 4/2005 | Das et al. ..................... 717/114 |

(Continued)

FOREIGN PATENT DOCUMENTS

CA    2345540    2/2001

(Continued)

OTHER PUBLICATIONS

Chen, Miaobo et al., "Java JNI Bridge: A Framework for Mixed Native ISA Execution," Proceedings of the International Symposium on Code Generation and Optimization, IEEE: Mar. 26-29, 2006, 11 pages.*

(Continued)

*Primary Examiner*—Michael J Yigdall
(74) *Attorney, Agent, or Firm*—Hanley, Flight & Zimmerman, LLC

(57) ABSTRACT

Methods and apparatus to implement annotation based thunking are disclosed. An example method comprises locating a parameter of a function, the parameter to be passed as a pointer if a size of the parameter is greater than a threshold and to be passed as data if the size of the parameter is not greater than the threshold, and adding an annotation record for the parameter to a byte code image file containing byte code for the function.

26 Claims, 7 Drawing Sheets

U.S. PATENT DOCUMENTS

| | | | |
|---|---|---|---|
| 2006/0078160 A1 | 4/2006 | Fujita et al. | |
| 2006/0225053 A1* | 10/2006 | Lakshman et al. | 717/140 |
| 2007/0136719 A1* | 6/2007 | Lagergren | 717/140 |

FOREIGN PATENT DOCUMENTS

| | | |
|---|---|---|
| CA | 2387216 | 4/2001 |
| CA | 2387217 | 4/2001 |
| CA | 2398370 | 4/2001 |
| CA | 2398385 | 4/2001 |
| CN | 1661550 A | 8/2005 |
| JP | 2002163167 | 6/2002 |
| JP | 2005309593 | 11/2005 |
| WO | WO 2005091772 A2 * | 10/2005 |

OTHER PUBLICATIONS

Wienholt; VSTS Annotations for C++; Jupitermedia Corp; Apr. 2006; 3 pages. Retrieved from <http://www.codeguru.com/columns/kate/article.php/c11725/>.*

Microsoft; SAL Annotations; Microsoft; Apr. 20, 2006; 6 pages. Retrieved from <http://web.archive.org/web/20060420093259/http://msdn2.microsoft.com/en-us/library/ms235402(VS.80).aspx>.*

Intel, "Extensible Firmware Interface Specification", Dec. 1, 2002, 77 Pages.

Submitted herewith is a copy of a Written Opinion received on Jan. 11, 2007, in corresponding PCT Application No. PCT/CN2006/000529, filed Mar. 28, 2006, 3 pages.

Submitted herewith is a copy of an International Search Report received on Jan. 11, 2007, in corresponding PCT Application No. PCT/CN2006/000529, filed Mar. 28, 2006, 5 pages.

Wienholt; VSTS Annotations for C++; Jupitermedia Corp; Apr. 2006.

WIPO Patent #WO05091772; Jun. 10, 2005; Liberate Technologies.

Microsoft; SAL Annotations; Microsoft; Apr. 20, 2006.

* cited by examiner

METHODS AND APPARATUS TO IMPLEMENT ANNOTATION BASED THUNKING

RELATED APPLICATIONS

This patent arises from a continuation of International Patent Application No. PCT/CN2006/000579, entitled "Methods and Apparatus to Implement Annotation Based Thunking" which was filed on Mar. 28, 2006. International Patent Application No. PCT/CN2006/000579 is hereby incorporated by reference in its entirety.

FIELD OF THE DISCLOSURE

This disclosure relates generally to thunking and, more particularly, to methods and apparatus to implement annotation based thunking.

BACKGROUND

Thunking describes any variety of process by which a first process executing a first set of machine executable instructions compiled for a first platform type, word size, etc. (e.g., 32-bit code) is able to successfully make a function call to another set of machine executable instructions compiled for a second platform type, word size, etc. (e.g., 16-bit code). In general, thunking involves a translation of function calls, function call parameters and/or return parameters between at least two processes compiled for different platform types, word sizes, etc.

For instance, consider an example in which a process executing native code compiled for a particular type of processor makes a function call to a platform-independent byte code function being executed by a virtual machine that is also executed upon the processor. Thunking for such an example system involves having the virtual machine copy data (e.g., calling parameters) from the processor's registers and/or slots of the native code's run-time stack (i.e., native stack slots) into a byte code stack before the byte code is executed by the virtual machine. The copying of the data to the byte code stack is the mechanism by which parameters are passed into the called byte code function. Likewise, return values can be copied from the byte code stack into the registers and/or native stack slots.

Generally, calling parameters can be either data (i.e., data parameters) or pointers to data (i.e., pointer parameters). However, increasingly, native code is using more sophisticated calling procedures such as, for example, calling a byte code function with a data calling parameter that is passed as data or is passed as a pointer to the data, depending upon the size of the data to be passed. For example, in an Intel® Extended Memory 64 Technology (a.k.a. EM64T) based platform, a data parameter with a data structure type (e.g., structure, union, class) will be passed either by value (through register or run-time stack) if the size of the data structure is ≦64 bits, or by pointer if the data structure size is >64 bits. If a pointer is passed, the pointer (64-bit) will be passed through register or run-time stack, while the actual data structure value (pointed by the pointer) exists in the run-time stack and/or any addressable memory location. Further, on an EM64T platform, the parameter passing mechanism is a dynamic one (i.e., either pass by value or pass by pointer) for a parameter with data structure type. Consider an example byte code function called from inside EM64T native code having the following function prototype:

void foo (struct Q myParameter 1, struct T myParameter 2).

Currently, the virtual machine has no way to know whether the example data structures are passed as data (i.e., by value) or a pointer to the data and, thus, the virtual machine cannot successfully implement the necessary thunking between the EM64T native code and the called byte code function. That is, the virtual machine will have no idea whether a 64-bit value that exists in a register (or a native stack slot) is an actual value of one of the data structure parameters or a pointer that points to an actual value. In such an example, it is impossible for the virtual machine to correctly copy the exact data structure value to the byte code stack.

DETAILED DESCRIPTION

Figure 1:
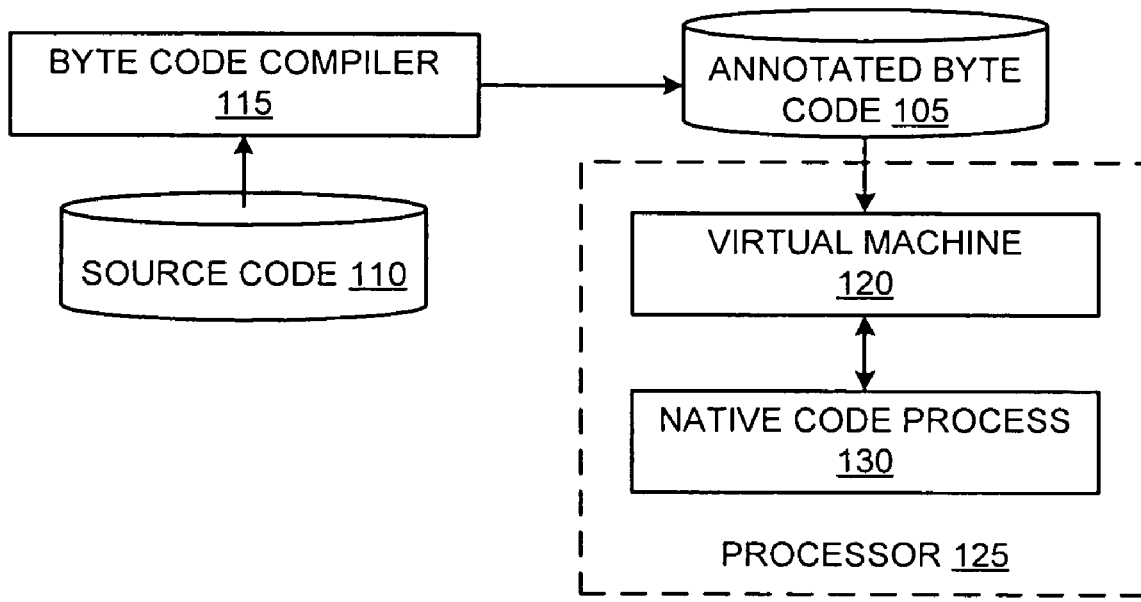
FIG. 1 is a schematic illustration of an example system to perform annotation based thunking.

FIG. 1 is a schematic illustration of an example system to implement annotation based thunking between native code (i.e., platform-dependent code) and platform-independent byte code. To generate platform-independent byte code 105 from source code 110, the example system of FIG. 1 includes a byte code compiler 115. The example byte code compiler 115 of FIG. 1 generates the platform-independent byte code 105 using any variety of methods, techniques and/or processes. Additionally, the example byte code compiler 115 of FIG. 1, as described below in connection with FIGS. 2, 3A, 3B and 4, creates and adds annotations records to the example byte code 105. In the example system of FIG. 1, the annotation records are used to facilitate thunking. The source code 110 may be any variety and/or number of source code files such as, for example, a 'C' language source code file. The example byte code 105 of FIG. 1 is stored as binary data in a byte code image file such as, for example, a portable executable (PE)/common object file format (COFF) file.

To execute the annotated platform-independent byte code 105, the example system of FIG. 1 includes a virtual machine 120. As discussed below in connection with FIG. 5, the example virtual machine 120 implements an emulator to allow the platform-independent byte code 105 to be executed upon a particular processor. Additionally, as discussed below in connection with FIGS. 6 and 7, the example virtual machine 120 of FIG. 1 performs thunking between the example annotated byte code 105 and other processes. In the illustrated example, the example virtual machine 120 is implemented as a process executing upon a processor 125.

The example processor 125 of FIG. 1 may be any type of processing unit, such as, for example, a processor from any of the Intel® families of processors. The example processor 125 of FIG. 1 may execute, among other things, the example machine accessible instructions of FIG. 7 to implement the example virtual machine 120 of FIG. 1 and/or may execute platform-dependent code (i.e., native code) to implement a native code process 130.

The example native code process 130 of FIG. 1 may be used to implement any variety of functions, may be generated using any variety and/or number of source code files, and/or may be compiled to create the native code being executed using any variety of source code compiler(s). In the example system of FIG. 1, the example source code 110 and the source code for the native code process 130 are developed using a common source code language.

In addition to executing the annotated platform-independent byte code 105, based upon the annotation records added to the example annotated byte code 105 by the example byte code compiler 115, the example virtual machine 120 of FIG. 1 implements thunking between (1) functions provided by execution of the example annotated byte code 105 (i.e., byte code functions) and (2) functions provided by the example native code process 130 (i.e., native code functions). In the illustrated example, the native code functions may call byte code functions and vice versa. The thunking implemented by the example virtual machine 120 of FIG. 1 allows for calling and/or return data parameters to be correctly passed between byte code functions and native code functions whether, depending upon the size of a data parameter, the data parameter (a) is passed as data or (b) is passed as a pointer to the data (e.g., the address and/or location of the data as is conventional). Consider an example function call having a data structure calling parameter (i.e., data parameter). If the platform-dependent size of the data structure is small, then the data structure is passed directly as data. As used herein, the term platform-dependent size is used to refer to the size of the data structure when implemented on a particular platform. However, if the platform-dependent size of the data structure is greater than a platform-dependent threshold, then an address and/or location of (i.e., a pointer to) the data structure is passed instead of passing the data structure directly. The passed pointer can be used by a receiving process and/or the example virtual machine 120 to locate and/or obtain the data structure. The example virtual machine 120 of FIG. 1 also correctly thunks (1) calling and/or return data parameters that passed as data and/or (2) calling and/or return parameters that are pointers to data (i.e., pointer parameters).

For simplicity and ease of understanding, the following disclosure references the example system illustrated in FIG. 1. However, the example virtual machine 120 of FIG. 1 may perform thunking between any number of native processes and/or functions and any number of byte code functions provided via any number of annotated byte code image files. Additionally, the example native process 130 and the virtual machine 120 may be executed upon any number of processors and/or cores contained in, for example, a multiple-processor and/or multi-core computing device, system and/or platform. Further, the processor 125 may implement any variety of operating system in addition to the example native process 130 and the example virtual machine 120. Moreover, while the following discussion references the calling of byte code functions by the native process 130, persons of ordinary skill in the art will readily appreciate that the methods and apparatus described herein can likewise be used to facilitate thunking for native code functions called by the example byte code 105.

Figure 2:
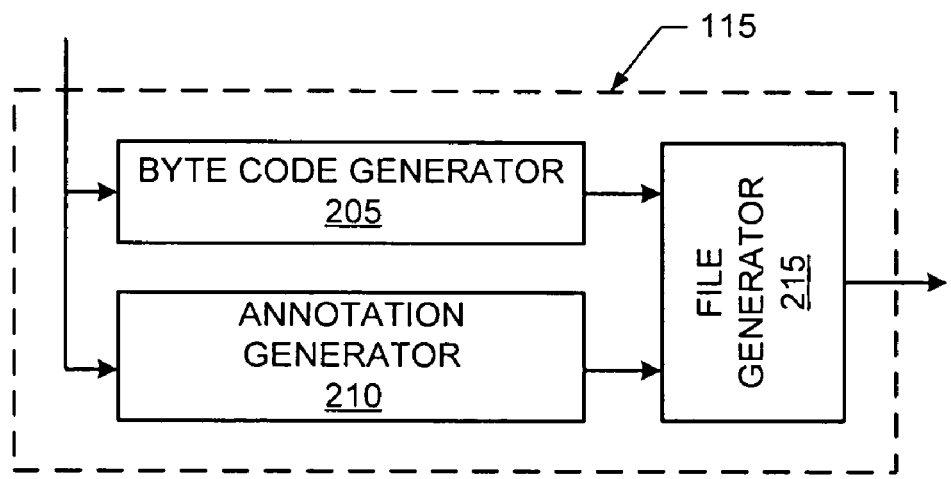
FIG. 2 illustrates an example manner of implementing the example byte code compiler of FIG. 1.

FIG. 2 illustrates an example manner of implementing the example byte code compiler 115 of FIG. 1. To generate platform-independent byte code, the example byte code compiler 115 of FIG. 2 includes any variety of byte code generator 205. Using any variety of techniques, methods and/or algorithms, the example byte code generator 205 of FIG. 2 generates platform-independent byte code for each function present in any number of input source code files to be included in an annotated byte code image.

To generate annotation records that the example virtual machine 120 of FIG. 1 uses to perform thunking, the example byte code compiler 115 of FIG. 2 includes an annotation generator 210. For each function present in a byte code image, the example annotation generator 210 of FIG. 2 determines if the function has any calling and/or return parameters that may be passed as either data or a pointer, depending upon the platform-dependent size of the data. For such parameters, the example annotation generator 210 determines a platform-independent representation of the size of the data and a platform-independent representation of the offset of the parameter. As illustrated in examples of FIGS. 3A and 3B, the annotation record generated for each such parameter includes the virtual address of the function, the platform-independent offset of the parameter, and the platform-independent size of the parameter. In the examples of FIGS. 1 and 2, not every calling and/or return parameter of each function has an annotation record.

In the illustrated examples of FIGS. 1 and 2, platform-independent parameter sizes and parameter offsets are represented as natural constants. A natural constant represents an integer number (e.g., the size of a data structure) as a pair of numbers (A, B). For a particular platform, the platform-dependent size of the data structure can be computed as $A*C+B$, where C is the platform-dependent size of a pointer. An example natural constant (2, 8) can be used to represent the size of a data structure that contains a character field, one pointer field and one int64 field. For an IA-32 Intel® processor the platform-dependent size of the data structure is $2*4+8=16$ bits, while for Intel® Extended Memory 64 Technology (Intel® EM64T) processor, the platform-dependent size of the data structure is $2*8+8=24$ bits. In both cases, the platform-independent natural constant accurately represents the platform-dependent size of the example data structure. If a parameter has a size that is not platform-dependent, the platform-independent size is represented by a natural constant of (0, N), where N is the size of the parameter. Natural constant numbers may be implemented using any bit width such as, for example, bits, bytes, words, etc. Addition of natural constants may be performed by summing the two numbers of the natural constant separately. For example, the addition of two natural constants (1, 8) and (3, 0) results in a natural constant of (4, 8).

In the examples of FIGS. 1 and 2, the natural constant offset of a calling and/or return parameter represents the starting location of the calling and/or return parameter in a sequence of registers and/or stack slots used to pass the calling and/or return parameter. That is, each of a calling and/or return parameters requires some number of registers and/or stack slots to pass the data being passed and/or to pass a pointer to the data. When a data parameter or pointer parameter is passed, the number of registers and/or stack slots used depends upon the platform-dependent size of the data or pointer parameter and the size of the registers and/or stack slots. When, based upon the size of a data parameter, a data parameter is passed as a pointer instead of data, the number of registers and/or stack slots used depends upon the combined platform-dependent size of the pointer and the data, and the size of the registers and/or stack slots. For such example data parameters, the natural constant offset and the natural constant size can be used to determine if a data parameter is passed as data or a pointer and/or to locate the start of the data and/or the pointer in the sequence of registers and/or stack slots.

In the examples of FIGS. 1 and 2, the natural constant offset of a calling and/or return parameter is the sum of the natural constant sizes for the parameters that precede the parameter in the list of calling and/or return parameters. Consider an example where a first calling parameter is a data parameter passed as data, a second calling parameter is a pointer parameter and a third calling parameter is a data parameter that, based on the size of the data, may be passed as a pointer or data. In this example, the natural constant offset of the example third calling parameter is the sum of the natural constant size of the first parameter and the size of the second parameter. Alternatively, the natural constant offset of the third parameter may be computed by adding the natural constant offset of the preceding parameter to the natural constant size of the preceding parameter In the examples of FIGS. 1 and 2, the first parameter in a list of calling and/or return parameters has a natural constant offset of (0, 0).

In the examples of FIGS. 1 and 2, the natural constant size of a calling and/or return parameter reflects the size of the parameter and does not depend upon whether the calling and/or return parameter is passed directly as data or is passed as a pointer to the data.

To combine the platform-independent byte code generated by the example byte code generator 205 and the annotation records generated by the example annotation generator 210, the example byte code compiler 215 of FIG. 2 includes a file generator 215. The example file generator 215 of FIG. 2 generates a byte code image file in accordance with any of a variety of byte code image file formats such as the Microsoft® PE/COFF file format.

In the illustrated example, the example byte code generator 205, the example annotation generator 210, the example file generator 215 of FIG. 2 and/or, more generally, the example byte code compiler 115 are implemented by executing machine accessible instructions upon any variety of processor(s) such as, for example, the example processor shown in the example processor platform 8000 and discussed below in conjunction with FIG. 8. While, the example byte code compiler 115 is described with reference to the illustrated example of FIG. 2, persons of ordinary skill in the art will readily appreciate that the example byte code compiler 115, the example byte code generator 205, the example annotation generator 210 and/or the example file generator 215 may be implemented using any variety, type, number and/or combination of software processes, firmware processes and/or hardware. For example, the example byte code compiler 115 of FIG. 2 may be implemented as a single process with the example byte code generator 205, the example annotation generator 210 and the example file generator 215 realized as functions and/or sub-functions utilized within the process. Other examples abound.

Figure 3A:
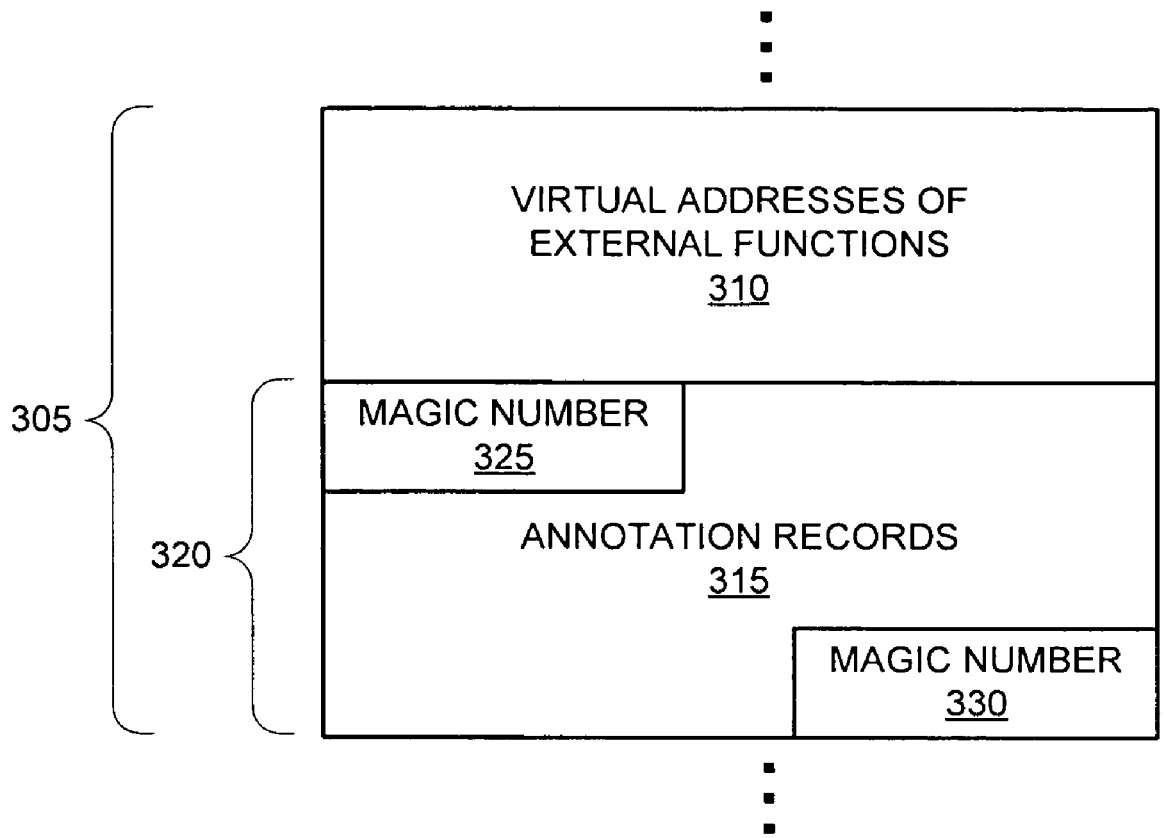
FIGS. 3A and 3B illustrate portions of an example byte code image file.

FIG. 3A illustrates an example portion 305 of an example Microsoft® PE/COFF based byte code image file. In the example of FIG. 3A, the example portion 305 is contained in an .rdata section of the byte code image file. To store a list of virtual addresses of the functions that are externally exposed (i.e., available to be called by another process such as, for example, the example native process 130 of FIG. 1), the example of FIG. 3A includes a table 310. The example table 310 of FIG. 3 allows the example virtual machine 120 of FIG. 1, using any variety of technique, to determine, for a called function, the function's virtual address. Based upon the functions virtual address, the example virtual machine 120 can locate any annotations records associated with any function. In the illustrated example of FIG. 3A, the virtual addresses and annotation records for all external functions contained in a byte code image file are located together in a single portion 305 of a byte code image file. Byte code generated by, for example, the example byte code generator 205 of FIG. 2, is stored conventionally in other applicable portions of the byte code image file.

To store annotation records 315, the example portion 305 of FIG. 3A includes a data section 320. The example data section 320 of FIG. 3A includes a magic number 325 that uniquely delineates the start of the data section 320 and a second magic number 330 that uniquely delineates the end of the example data section 320. The example magic numbers 325 and 330 may be identical. The example magic numbers 325 and 330 allow the example virtual machine 120 of FIG. 1 to uniquely identify and locate the start and end of the example data section 320. In the illustrated example of FIG. 3A, the annotation records 315 are located between the delineating magic numbers 320 and 325.

For a virtual machine that does not implement the thunking methods and apparatus disclosed herein, the virtual machine can ignore the table 310 and/or the data section 320. As such, the example portion 305 illustrated in FIG. 3A allows for backwards compatibility with existing virtual machine implementations.

Figure 3B:
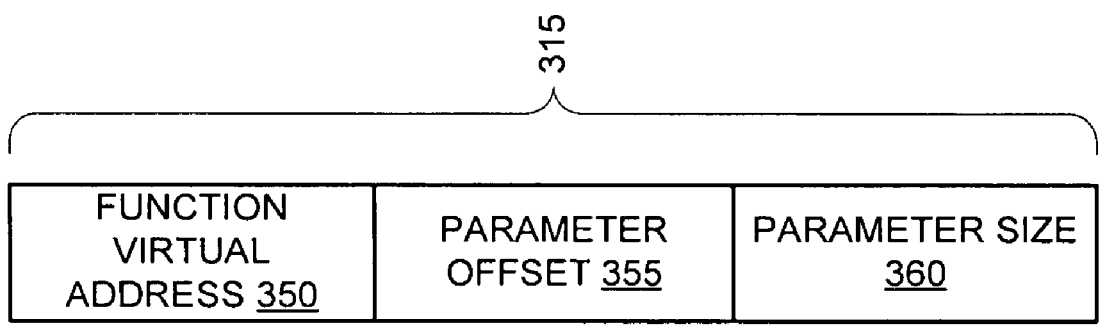

FIG. 3B illustrates an example structure for the annotation records 315 of FIG. 3A. The example annotation record 315 of FIG. 3B includes (a) the virtual address 350 of the function with which the annotation record is associated, (b) the natural constant offset 355 of the parameter and (c) the natural constant size 360 of the parameter.

While FIGS. 3A and 3B illustrate an example byte code image file format that includes annotation information and/or records to facilitate thunking, persons of ordinary skill in the art will readily appreciate that any variety of file formats, tables and/or data structures may be used to store and/or represent annotation records and/or information. For instance, annotation records may be stored in multiple sections of a byte code image file, etc.

Figure 4:
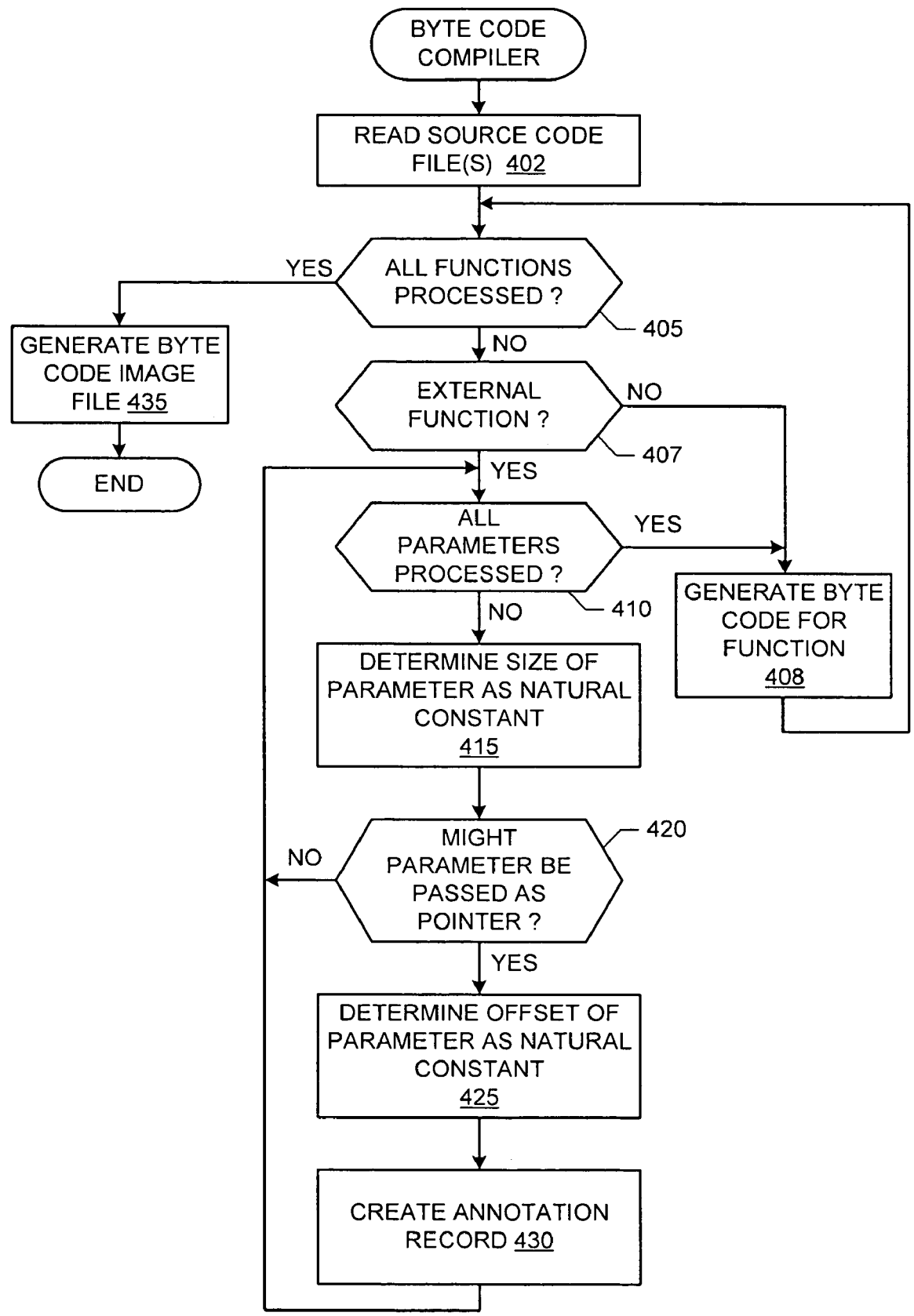
FIG. 4 is a flowchart representative of example machine accessible instructions which may be executed to implement the example byte code compiler of FIGS. 1 and/or 2.

FIG. 4 illustrates a flowchart representative of example machine accessible instructions that may be executed to implement the example byte code compiler 115 of FIGS. 1 and/or 2. The example machine accessible instructions of FIG. 4 may be executed by a processor, a controller and/or any other suitable processing device. For example, the example machine accessible instructions of FIG. 4 may be embodied in coded instructions stored on a tangible medium such as a flash memory, or random access memory (RAM) associated with a processor (e.g., the processor 8010 shown in the example processor platform 8000 and discussed below in conjunction with FIG. 8). Alternatively, some or all of the example flowchart of FIG. 4 may be implemented using an application specific integrated circuit (ASIC), a programmable logic device (PLD), a field programmable logic device (FPLD), discrete logic, hardware, firmware, etc. Also, some or all of the example flowchart of FIG. 4, the example byte code generator 205, the example annotation generator 210, the example file generator 215 and/or, more generally, the example byte code compiler 115 may be implemented manually or as combinations of any of the foregoing techniques, for example, a combination of firmware, software and/or hardware. Further, although the example machine accessible instructions of FIG. 4 are described with reference to the flowchart of FIG. 4, persons of ordinary skill in the art will readily appreciate that many other methods of implementing the example byte code compiler 115 of FIGS. 1 and/or 2 may be employed. For example, the order of execution of the blocks may be changed, and/or some of the blocks described may be changed, eliminated, sub-divided, or combined. Additionally, persons of ordinary skill in the art will appreciate that the example machine accessible instructions of FIG. 4 be carried out sequentially and/or carried out in parallel by, for example, separate processing threads, processors, devices, circuits, etc.

The example machine accessible instructions of FIG. 4 begin with the byte code compiler 120 reading the source code file(s) to be compiled and annotated to create a byte code image file (block 402). For each function contained in the source code file(s) (block 405), the byte code compiler 115 determines if the function is an externally exposed function (block 407). If the function is not external, the byte code compiler 115 generates byte code for the function (block 408). Control then returns to block 405 to process the next, if any (block 405), function.

If the function is externally exposed (block 407), the byte code compiler 115 processes each calling and/or return parameter (block 410). For each calling and/or return parameter (block 410), the byte code compiler 115 determines the size of the parameter as a natural constant (block 415). If the way the parameter will be passed does not depend upon a potential platform-dependent size of the parameter (block 420), control returns to block 410 to process the next, if any, parameter. If, based on a potential platform-dependent size of the parameter, the parameter may be passed as a pointer instead of as data (block 420), the byte code compiler 120 determines the offset of the parameter as a natural constant (block 425) and creates an annotation record (block 430). Control then returns to block 410 to process the next if any (block 410), parameter.

Returning to block 410, when all parameters of the function have been processed, the byte code compiler 115 generates byte code for the function (block 408). Control then returns to block 405 to process the next, if any (block 405), function.

Returning to block 405, when all functions have been processed, the byte code compiler 115 generates a byte code image file (e.g., the example byte code image file of FIGS. 3A and 3B) containing the generated byte code, any annotation records created, and the virtual addresses of the processed functions (block 435). Control then exits from the example machine accessible instructions of FIG. 4.

Figure 5:
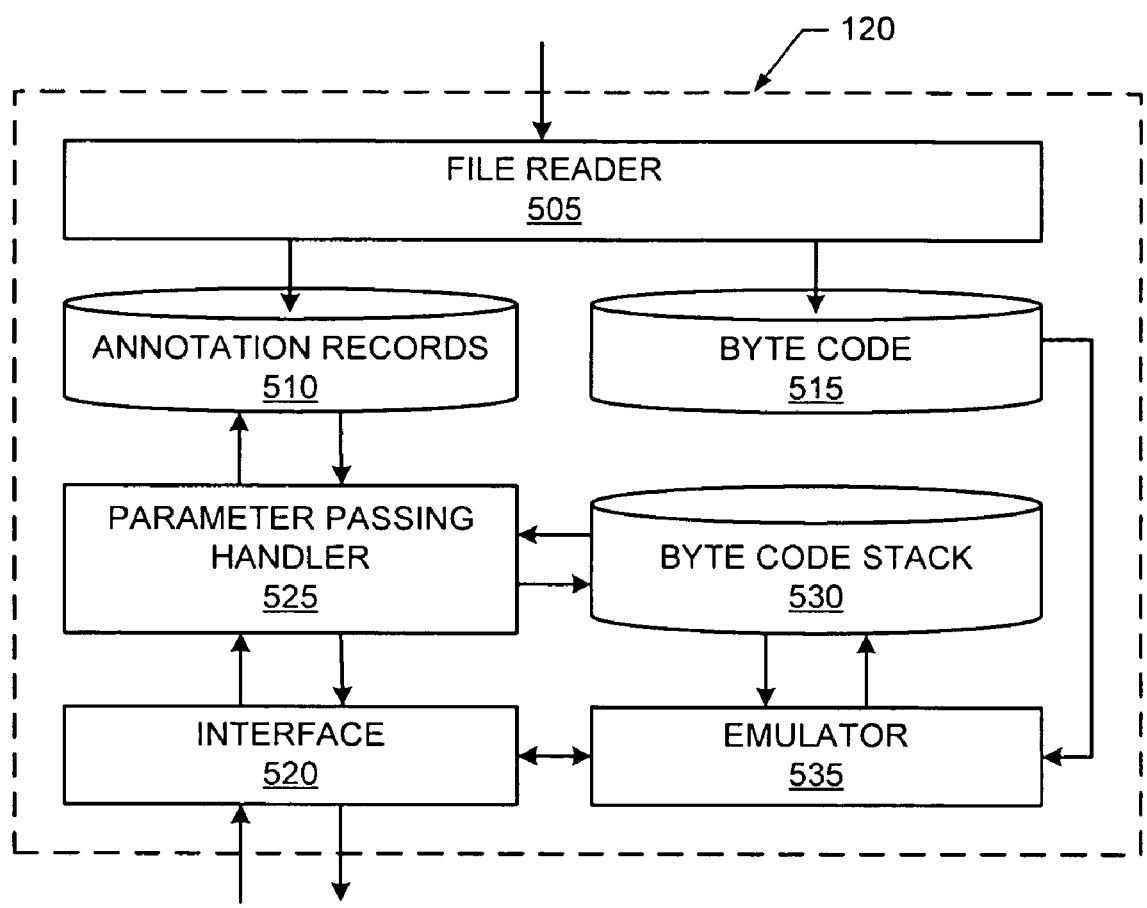
FIG. 5 illustrates an example manner of implementing the example virtual machine of FIG. 1.

FIG. 5 illustrates an example manner of implementing the example virtual machine 120 of FIG. 1. To read and/or parse a byte code image file, the example virtual machine 120 of FIG. 5 includes any variety of file reader 505. The example file reader 505 of FIG. 5 reads and/or parses the byte code image file to locate annotation records and virtual addresses of functions and places them in a first portion of memory 510. The example file reader 505 of FIG. 5 likewise reads and/or parses the byte code image file to locate the platform-independent byte code and places it in a second portion of memory 515.

To receive function calls to the byte code 515, the example virtual machine 120 of FIG. 5 includes any variety of interface 520. The example interface 520 of FIG. 5 receives the function call and any parameters passed to the called function. After the called function returns, the example interface 520 provides the return parameters, if any, to the calling function. In the examples of FIGS. 1 and 5, the calling and/or return parameters may be passed in processor registers and/or stack slots of the calling native process' stack (i.e., native stack slots).

To perform thunking of calling and/or return parameters between the calling function of the native process and the called byte code function, the example virtual machine 120 of FIG. 5 includes a parameter passing handler 525. Based on the annotation records 510 and as described below in connection with FIGS. 6 and 7, the example parameter passing handler 525 of FIG. 5 thunks (i.e., copies) data directly and/or based on pointers between the processor's registers and/or native stack slots and another portion of memory 530 implementing a byte code stack.

To execute the called byte code function, the example virtual machine 120 of FIG. 5 includes any variety of emulator 535. Using any of a variety of techniques and/or methods, the example emulator 535 of FIG. 5 translates the platform-independent byte code 515 such that the translated code may be executed by, for instance, the example processor 125 of FIG. 1. The translated code acquires calling parameters from the byte code stack 530 created by the example parameter passing handler 525, and places returns parameters into the byte code stack 530 upon completion of the function (i.e., upon return). The example parameter passing handler 525 of FIG. 5 then copies return parameters (directly as data and/or based on pointers) from the byte code stack 530 to the processor's registers and/or native stack slots.

In the illustrated example, the example file reader 505, the example interface 520, the example parameter passing handler 525, the emulator 535 and/or, more generally, the example virtual machine 120 are implemented by executing machine accessible instructions upon any variety of processor such as, for example, the example processor 125 of FIG. 1 and/or the example processor shown in the example processor platform 8000 and discussed below in conjunction with FIG. 8. While, the example virtual machine 120 is described with reference to the illustrated example of FIG. 5, persons of ordinary skill in the art will readily appreciate that the example virtual machine 120, the example file reader 505, the example interface 520, the example parameter passing handler 525 and/or the emulator 535 may be implemented using any variety, type, number and/or combination of software processes, firmware processes and/or hardware. For example, the example virtual machine 120 may be implemented as a single process with the example file reader 505, the example interface 520, the example parameter passing handler 525, the emulator 535 realized as functions and/or sub-functions within the process. Other examples abound.

Figure 6:
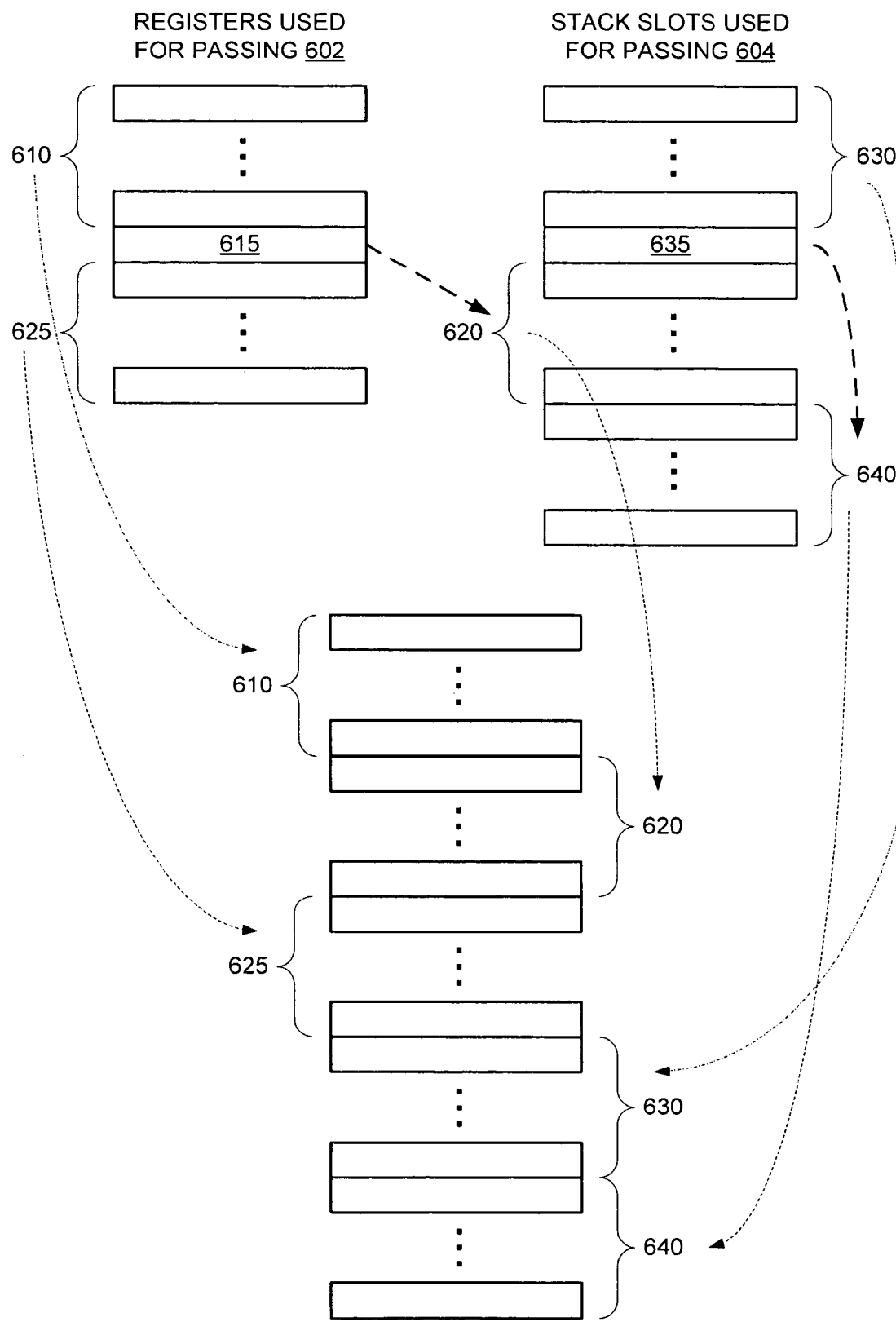
FIG. 6 illustrates an example thunking (i.e., passing) of data between the example native code and the example annotated byte code of FIG. 1.

FIG. 6 illustrates an example thunking of calling parameters between a calling native code process (e.g., the native process 130) and a called byte code function (e.g., some or all of the example annotated byte code 105). In the illustrated example of FIG. 6, calling parameters being passed to the byte code function are provided via a set of processor registers 602 and a set of native stack slots 604. The example parameter passing handler 525 of FIG. 5 copies the parameters directly and/or based on pointers into a byte code stack 606.

In the illustrated examples of FIGS. 1, 5, 6 and/or 7, parameter data is first copied from the processor registers 602 and then copied from the native stack slots 604. In the illustrated examples, using any of a variety of methods, techniques and/ or calculations, parameter offset values contained in annotation records are used to determine which parameter registers and/or native stack slots contain the associated passed data or passed pointer. Whether each register 602 and/or stack slot 604 contains data or a pointer to data is determined by the example parameter passing handler 525 of FIG. 5 based upon associated annotation records. The example parameter passing handler 525 first determines if any annotation records are associated with the called function. If there is at least one annotation record for the function, the example parameter passing handler 525 determines if any of the annotation records correspond to the current register and/or stack slot being processed. If there is an applicable annotation record, the example parameter passing handler 525 computes the platform-dependent size of the parameter from the natural constant parameter size contained in the annotation record. The example parameter passing handler 525 of FIG. 5 uses the platform-dependent size to determine if the parameter is being passed as data or as a pointer to data. In the illustrated examples, if the platform-dependent size is greater than a platform-dependent threshold, the parameter is passed as a pointer rather than directly as data. Based upon the size, the parameter is either copied directly as data, or the provided (i.e., passed) pointer is used to locate and copy the data to the byte code stack.

In the example of FIG. 6, the example parameter passing handler 525 of FIG. 5 determines that a first set of register contents 610 for a first set of calling parameters are to be copied directly as data 610 from the processor registers 602 to the byte code stack 606 since they have associated annotation records. Since passed parameters may require more than one register and/or stack slot, the number of registers and/or stack slots copied is not necessarily the same as the number of parameters passed.

For example of illustration, it is now assumed that, based upon an annotation record associated with the next register 615 to be processed by the parameter passing handler 525, the example parameter passing handler 525 may make this determination by detecting that the next parameter is being passed as a pointer 615. For example, the parameter passing handler 525 determines that the platform-dependent size of the parameter is larger than a platform-dependent threshold. The example parameter passing handler 525 then uses the pointer 615 to locate and copy data 620 pointed to by the pointer 615. In the example of FIG. 6, the pointed to data 620 is located in and is copied from the native stack slots 604 to the byte code stack 606.

Based upon an absence of corresponding annotation records and/or because their platform-dependent sizes indicate they are passed directly, in the example of FIG. 6, another set of register contents 625 corresponding to another set of parameters are copied directly from the processor registers 602 to the byte code stack 606 by the example parameter passing handler 525. Likewise, yet another set of parameter data 630 is copied directly from the native stack slots 604 to the byte code stack 606 in the example of FIG. 6.

In the example of FIG. 6, a last stack slot 635 has an associated annotation record indicating that the last parameter is large enough to be passed via a pointer 635. The example parameter passing handler 525 of FIG. 5 uses the pointer 635 to locate and copy the last parameter 640 from the stack slots 604 to the byte code stack 606 as illustrated in FIG. 6.

Figure 7:
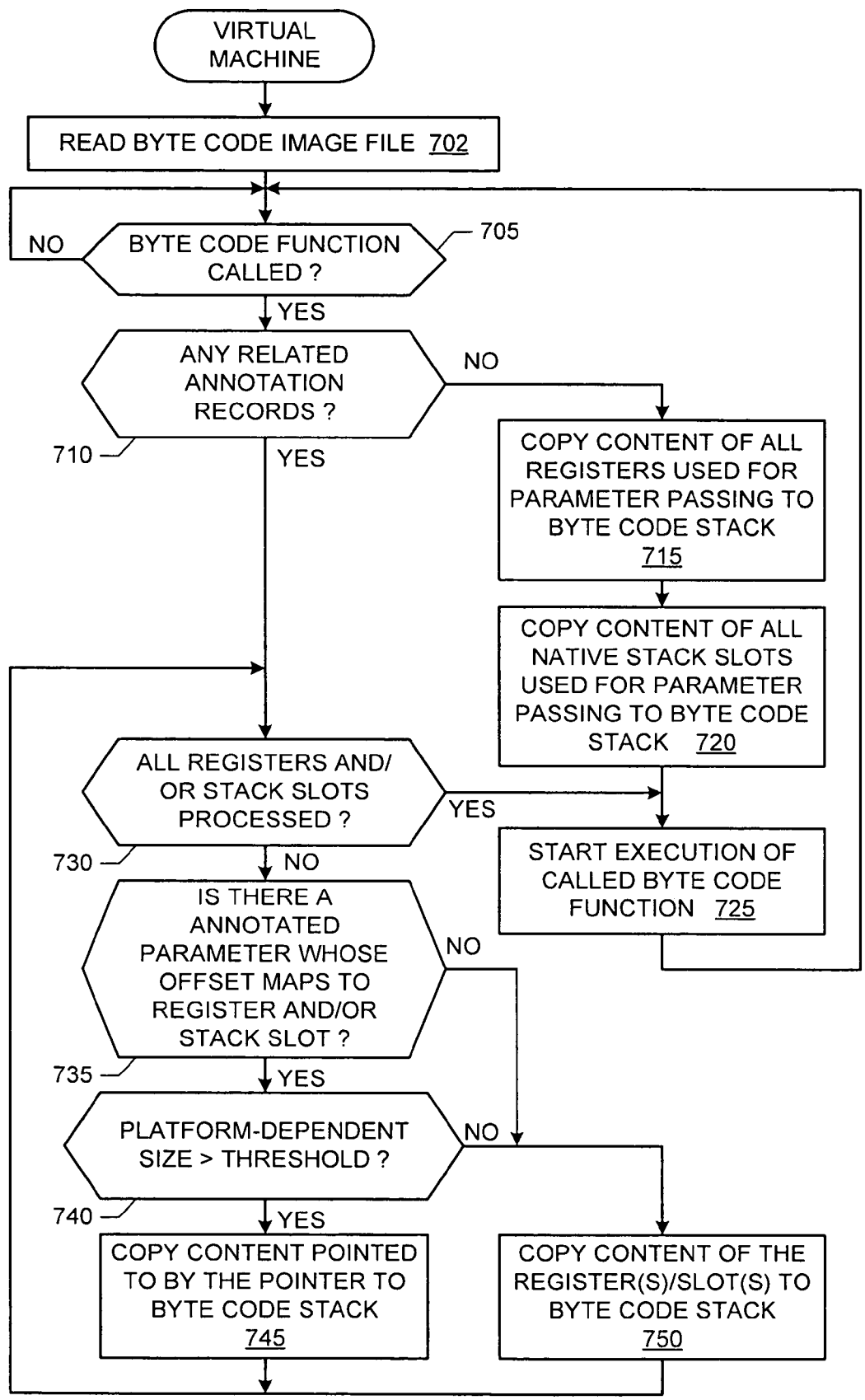
FIG. 7 is a flowchart representative of example machine accessible instructions which may be executed to implement the example virtual machine of FIGS. 1 and/or 5.

FIG. 7 illustrates a flowchart representative of example machine accessible instructions that may be executed to implement the example virtual machine 120 of FIGS. 1 and/or 5. The example machine accessible instructions of FIG. 7 may be executed by a processor, a controller and/or any other suitable processing device. For example, the example machine accessible instructions of FIG. 7 may be embodied in coded instructions stored on a tangible medium such as a flash memory, or RAM associated with a processor (e.g., the example processor 125 of FIG. 1 and/or the processor 8010 shown in the example processor platform 8000 and discussed below in conjunction with FIG. 8). Alternatively, some or all of the example flowchart of FIG. 7 may be implemented using an ASIC, a PLD, a FPLD, discrete logic, hardware, firmware, etc. Also, some or all of the example flowchart of FIG. 7, the example virtual machine 120, the example interface 520, the example parameter passing handler 525, the emulator and/or the file reader 505 may be implemented manually or as combinations of any of the foregoing techniques, for example, a combination of firmware, software and/or hardware. Further, although the example machine accessible instructions of FIG. 7 are described with reference to the flowchart of FIG. 7, persons of ordinary skill in the art will readily appreciate that many other methods of implementing the example virtual machine 120 of FIGS. 1 and/or 5 may be employed. For example, the order of execution of the blocks may be changed, and/or some of the blocks described may be changed, eliminated, sub-divided, or combined. Additionally, persons of ordinary skill in the art will appreciate that the example machine accessible instructions of FIG. 7 be carried out sequentially and/or carried out in parallel by, for example, separate processing threads, processors, devices, circuits, etc.

While the example machine accessible instructions of FIG. 7 illustrates the thunking of calling parameters, persons of ordinary skill in the art will readily appreciate that the example of FIG. 7 can be easily adapted and/or modified to alternatively and/or additionally handle the thunking of return parameters. Further, the example of FIG. 7 may be easily adapted and/or modified to handle the thunking of calling and/or return parameters for the calling of a native code function by a byte code function.

The example machine accessible instructions of FIG. 7 begin with a virtual machine 120 reading a byte code image file (block 702). The virtual machine 120 then waits to receive a function call to a byte code function (block 705). When a call to a byte code function is received (block 705), the virtual machine 120 determines, based on the virtual address of the called function, if there are annotation records associated with the called function (block 710). If there are no annotation records associated with the called function (block 710), the virtual machine 120 copies the contents of all processor registers used for parameter passing to the byte code stack (block 715) and copies the contents of all native stack slots used for parameter passing to the byte code stack (block 720). The virtual machine 120 then executes the called byte code function (block 725). Control then returns to block 705 to wait for a call to another byte code function to occur.

Returning to block 710, if at least one annotation record for the called function is present, the virtual machine 120 processes each of the processor registers and/or stack slots (block 730). When all registers and/or stack slots have been processed (block 730), the virtual machine 120 then executes the called byte code function (block 725). Control then returns to block 705 to wait for a call to another byte code function to occur.

Returning to block 730, for each processor register and/or native stack slot, the virtual machine 120 determines if there is an annotation record for the register/stack slot (block 735). The virtual machine 120 makes the determination based upon whether a parameter offset in an annotation record (as a platform-dependent value computed from a natural constant)

maps to the register/stack slot. If there is an annotation record for the register/stack slot (block 735), the virtual machine 120 determines if the platform-dependent size of the parameter computed from the natural constant parameter size is greater than a threshold (block 740). If the platform-dependent size is greater than the threshold (block 740), the virtual machine 120 copies the data pointed to by the passed pointer to the byte code stack (block 745). If the platform-dependent size is less than or equal to the threshold (block 740), the virtual machine 120 copies the data directly from the register/slots to the byte code stack (block 750). In both cases, the amount of data copied corresponds to the platform-dependent size. For example, the platform-dependent size determines the number of register/slot contents copied to the byte code stack (block 750). Control then returns to block 730 to process the next, if any, calling parameter.

Returning to block 735, if there is not an annotation record for a given processor register and/or native stack slot, the virtual machine 120 copies the corresponding data directly from the register/slots to the byte code stack (block 750). Control then returns to block 730 to process the next, if any, calling parameter.

Figure 8:
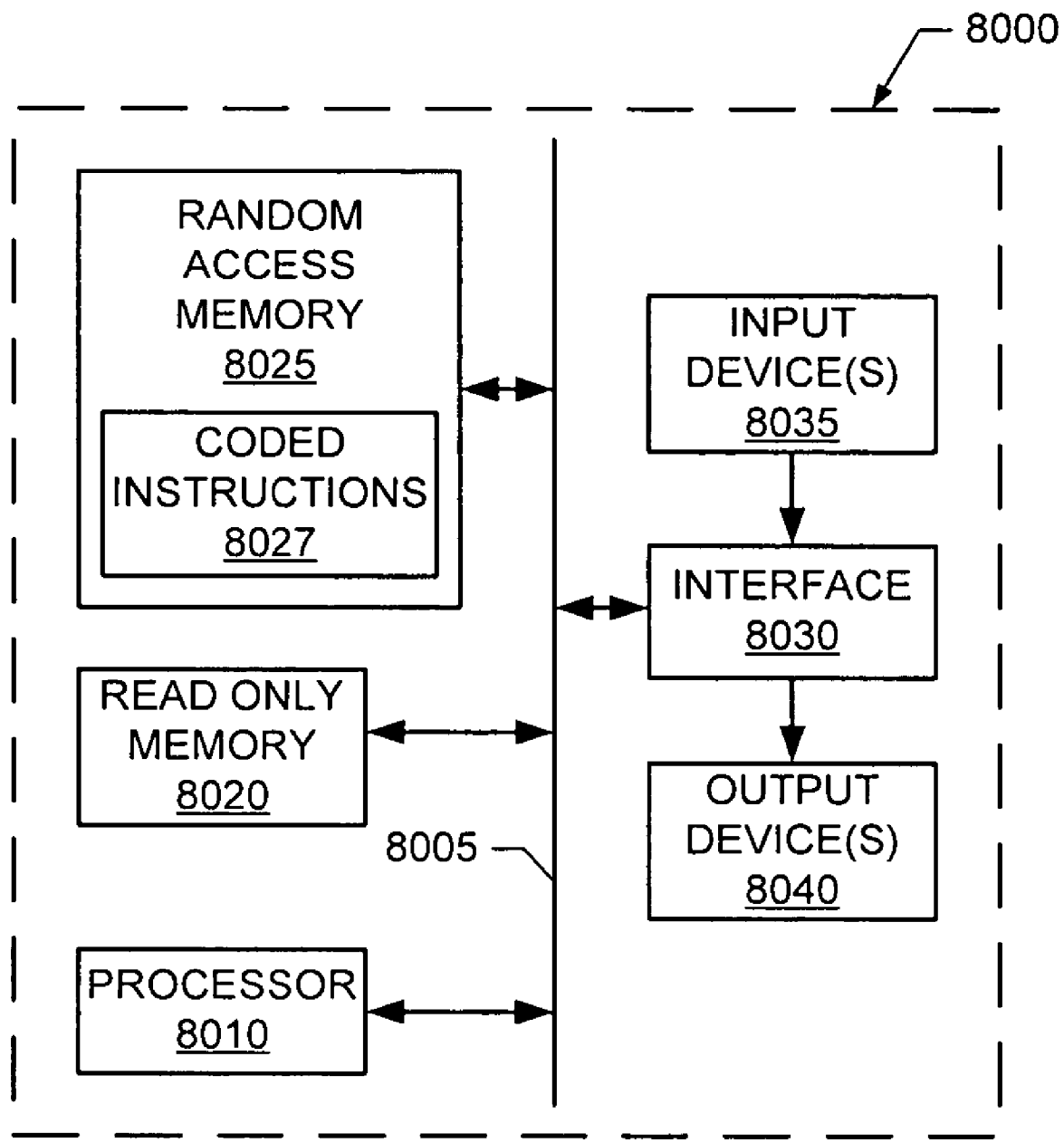
FIG. 8 is a schematic illustration of an example processor platform that may be used and/or programmed to execute the example machine accessible instructions illustrated in FIGS. 4 and/or 7 to implement the example byte code compiler, the example virtual machine and/or, more generally, the example system of FIG. 1.

FIG. 8 is a schematic diagram of an example processor platform 8000 that may be used and/or programmed to implement the example byte code compiler 115, the example virtual machine 120, the example native code process 130 and/or, more generally, the example system of FIG. 1. For example, the processor platform 8000 can be implemented by one or more general purpose processors, microcontrollers, etc.

The processor platform 8000 of the example of FIG. 8 includes a general purpose programmable processor 8010. The processor 8010 executes coded instructions 8027 present in main memory of the processor 8010 (e.g., within a RAM 8025). The processor 8010 may be any type of processing unit, such as a processor from the Intel® families of processors. The processor 8010 may execute, among other things, the example machine accessible instructions of FIGS. 4 and/or 7 to implement the example byte code compiler 115, the example virtual machine 120, the example native code process 130 and/or, more generally, the example system of FIG. 1.

The processor 8010 is in communication with the main memory (including a read only memory (ROM) 8020 and the RAM 8025) via a bus 8005. The RAM 8025 may be implemented by dynamic random access memory (DRAM), Synchronous DRAM (SDRAM), and/or any other type of RAM device, and ROM may be implemented by flash memory and/or any other desired type of memory device. Access to the memory 8020 and 8025 is typically controlled by a memory controller (not shown) in a conventional manner.

The processor platform 8000 also includes a conventional interface circuit 8030. The interface circuit 8030 may be implemented by any type of well-known interface standard, such as an external memory interface, serial port, general purpose input/output, etc.

One or more input devices 8035 and one or more output devices 8040 are connected to the interface circuit 8030. For example, an input devices 8035 such as, for example, a hard disk drive may be used to store the example annotated byte code image 105 of FIG. 1.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
identifying in source code corresponding to a function a parameter of the function, the parameter to be passed as a pointer if a size of the parameter is greater than a threshold and to be passed as data if the size of the parameter is not greater than the threshold;
compiling the source code to generate executable byte code corresponding to the function;
creating an annotation record for the parameter based on the source code, wherein the executable byte code is generated independent of the annotation record; and
forming a compiled byte code image file containing the executable byte code and the annotation record.

2. A method as defined in claim 1, wherein the parameter is passed to the function when the function is called.

3. A method as defined in claim 1, wherein the parameter is returned from the function when the function exits.

4. A method as defined in claim 1, further comprising:
determining a platform-independent representation of the size of the parameter; and
including the platform-independent size representation in the annotation record.

5. A method as defined in claim 1, further comprising:
determining a platform-independent representation of an offset to the parameter; and
including the platform-independent offset representation in the annotation record.

6. A method as defined in claim 1, wherein the annotation record includes:
a virtual address of the function;
a value representative of the size of the parameter; and
a value representative of an offset to the parameter.

7. A method as defined in claim 1, further comprising storing the compiled byte code image file on a machine accessible tangible medium.

8. A method as defined in claim 1, further comprising transferring the compiled byte code image file to a processor, the processor to execute the executable byte code corresponding to the function.

9. An article of manufacture storing machine accessible instructions including compiled byte code corresponding to a function, and an annotation record for a parameter of the function that might be passed as a pointer or data depending on a size of the data relative to a threshold, wherein the compiled byte code is created without reference to the annotation record, wherein the annotation record is created based on source code corresponding to the function, and wherein the machine accessible instructions, when executed, cause a machine to:
determine if the parameter is passed as the pointer based on a value representative of the size of the data, the representative value contained in the annotation record; and
if the parameter is passed as the pointer, copy data pointed to by the pointer to a byte code stack.

10. An article of manufacture as defined in claim 9, wherein the annotation record includes:
a virtual address of the function;
the value representative of the size of the data; and
a value representative of an offset to the parameter.

11. An article of manufacture as defined in claim 10, wherein the value of the size of the data and the value of the offset to the parameter are represented independently of a platform implementation.

12. An article of manufacture storing machine accessible instructions that, when executed, cause a machine to:

identify in source code corresponding to a function a parameter of the function to be passed as a pointer if a size of the parameter is greater than a threshold and to be passed as data if the size of the parameter is not greater than the threshold;

compile the source code corresponding to the function to create executable byte code corresponding to the function;

create an annotation record for the parameter based on the source code, wherein the executable byte code is created independent of the annotation record; and store the annotation record and the executable byte code in a same file.

13. An article of manufacture as defined in claim 12, wherein the machine accessible instructions, when executed, cause the machine to:

determine a platform-independent representation of the size of the parameter; and include the platform-independent size representation in the annotation record.

14. An article of manufacture as defined in claim 12, wherein the machine accessible instructions, when executed, cause the machine to:

determine a platform-independent representation of an offset to the parameter; and include the platform-independent offset representation in the annotation record.

15. An article of manufacture as defined in claim 12, wherein the machine accessible instructions, when executed, cause the machine to execute the executable byte code corresponding to the function.

16. An article of manufacture as defined in claim 9, storing machine accessible instructions which, when executed, cause a machine to locate the annotation record in the machine accessible instructions.

17. An article of manufacture as defined in claim 9, wherein the machine accessible instructions, when executed, cause the machine to copy the parameter directly to the byte code stack if the parameter is not passed as the pointer.

18. An article of manufacture as defined in claim 9, wherein the machine accessible instructions, when executed, cause the machine to execute the compiled byte code corresponding to the function to process the byte code stack.

19. A method comprising:

locating in a compiled byte code image file an annotation record corresponding to a function having a parameter to be passed, the compiled byte code image file containing executable byte code corresponding to the function, wherein the annotation record is created based on source code corresponding to the function, and wherein the executable byte code is created independent of the annotation record;

determining if the parameter is passed as a pointer based on a value representative of a size of the parameter, wherein the annotation record comprises the representative value; and if the parameter is passed as the pointer, copying data pointed to by the pointer to a byte code stack.

20. A method as defined in claim 19, further comprising if the parameter is not passed as the pointer, copying the parameter directly to the byte code stack.

21. A method as defined in claim 19, further comprising executing the compiled byte code corresponding to the function to process the byte code stack.

22. A method as defined in claim 19, wherein the parameter is at least one of a calling parameter or a returned parameter.

23. An apparatus comprising:

an annotation generator to identify in source code a parameter of a function that might be passed as a pointer or data depending upon a size of the parameter, and to create an annotation record for the parameter from the source code;

a byte code generator to generate compiled byte code for the function independent of the annotation record; and a filter generator to store the annotation record and the compiled byte code in a same file, wherein at least one of the annotation generator, the byte code generator or the file generator is implemented in hardware.

24. An apparatus as defined in claim 23, wherein the file comprises a byte code image file.

25. An apparatus as defined in claim 23, wherein the annotation record includes:

a virtual address of the function;

a value representative of the size of the parameter; and a value representative of an offset to the parameter.

26. An apparatus as defined in claim 23, wherein the parameter is at least one of a calling parameter or a returned parameter.

* * * * *

UNITED STATES PATENT AND TRADEMARK OFFICE
CERTIFICATE OF CORRECTION

| | | |
|---|---|---|
| PATENT NO. | : 7,596,783 B2 | Page 1 of 1 |
| APPLICATION NO. | : 11/440850 | |
| DATED | : September 29, 2009 | |
| INVENTOR(S) | : Huang et al. | |

It is certified that error appears in the above-identified patent and that said Letters Patent is hereby corrected as shown below:

In the section entitled "Related U.S. Application Data": Replace the character "7" with the character "2". As corrected, the aforementioned section reads as follows:

"Continuation of application No. PCT/CN2006/00529, filed on Mar. 28, 2006."

Signed and Sealed this
Twentieth Day of September, 2011

David J. Kappos
*Director of the United States Patent and Trademark Office*